(12) United States Patent
Arnt

(10) Patent No.: US 7,611,176 B2
(45) Date of Patent: Nov. 3, 2009

(54) SAFETY BUMPER SYSTEM AND METHOD

(76) Inventor: David Arnt, 11142 E. Sorrel La., Scottsdale, AZ (US) 85259

( * ) Notice: Subject to any disclaimer, the term of this patent is extended or adjusted under 35 U.S.C. 154(b) by 94 days.

(21) Appl. No.: 11/851,800

(22) Filed: Sep. 7, 2007

(65) Prior Publication Data

US 2008/0290673 A1 Nov. 27, 2008

Related U.S. Application Data

(63) Continuation-in-part of application No. 11/752,207, filed on May 22, 2007, now abandoned.

(51) Int. Cl.
*B60R 19/02* (2006.01)
*B60R 19/56* (2006.01)
(52) U.S. Cl. .............. 293/102; 293/123; 293/142; 293/143
(58) Field of Classification Search ........... 293/102, 293/115, 123, 142, 143, 155; 296/187.09, 296/187.1, 187.11
See application file for complete search history.

(56) References Cited

U.S. PATENT DOCUMENTS

| | | | | |
|---|---|---|---|---|
| 3,677,594 A * | 7/1972 | Gussack et al. | ............. | 293/143 |
| 4,043,579 A * | 8/1977 | Meyer | ............. | 293/143 |
| 5,215,343 A * | 6/1993 | Fortune | ............. | 293/121 |
| 5,364,142 A * | 11/1994 | Coiner | ............. | 293/117 |
| 5,641,547 A * | 6/1997 | Dilley | ............. | 428/31 |
| 6,113,164 A * | 9/2000 | Setina | ............. | 293/142 |
| 6,511,109 B1 * | 1/2003 | Schultz et al. | ............. | 293/120 |
| 6,572,086 B2 * | 6/2003 | Kelly | ............. | 267/136 |

* cited by examiner

*Primary Examiner*—Glenn Dayoan
*Assistant Examiner*—Gregory Blankenship
(74) *Attorney, Agent, or Firm*—Craig Weiss; Veronica-Adele R. Cao; Weiss & Moy, P.C.

(57) ABSTRACT

A safety bumper system for a high profile vehicle, such as a pick-up truck or sport utility vehicle. The system comprises of a pair of vertical members which are coupled to the frame of a high profile vehicle, proximate one of the bumpers. The members are coupled so that they extend downward sufficiently to contact a bumper of a conventional passenger vehicle in the event of a collision between the high profile vehicle and the passenger vehicle. Impact pads are positioned over the vertical members, and bumper covers may be positioned over the pads. The impact pads may slope outwardly and include a plurality of grooves, in order to assist in preventing a conventional passenger vehicle from sliding upwardly or downwardly along the safety bumper system upon impact with the high profile vehicle.

13 Claims, 4 Drawing Sheets

SAFETY BUMPER SYSTEM AND METHOD

RELATED APPLICATION

This application is a continuation-in-part of U.S. patent application Ser. No. 11/752,207, filed May 22, 2007 now abandoned.

FIELD OF THE INVENTION

This invention relates generally to bumper systems and methods and, more particularly, to a safety bumper system and method for a high profile vehicle, such as a pick-up truck or sport utility vehicle.

BACKGROUND OF THE INVENTION

In recent years, sport utility vehicles ("SUV's") and pick-up trucks have become increasingly popular, particularly in the U.S. auto market. SUV's and trucks generally have a higher profile than conventional passenger vehicles. In a collision, for example where a truck or SUV rear-ends a conventional passenger vehicle, there is a potential that the bumper of the larger vehicle will contact the conventional passenger vehicle above the level of its bumper.

The consequences of such a bumper-on-vehicle collision can be devastating. The portion of the vehicle body above the bumper of a typical passenger vehicle is generally comprised of sheet metal, and is less structural in nature than the bumper or frame of the vehicle body. The bumper of the taller vehicle can more readily penetrate the sheet metal than it could a bumper or frame, potentially causing increased damage and creating a heightened risk of injury or death of persons traveling in the passenger vehicle. Similar risks can be created from impacts on the front or side portions of conventional passenger vehicles, as well.

The present invention is concerned with addressing the damage and injury risks associated with the height differential between a typical truck and/or SUV as compared to a conventional passenger vehicle.

SUMMARY OF THE INVENTION

In accordance with an embodiment of the present invention, a safety bumper system is disclosed. The system comprises, in combination: first and second vertical members adapted to be coupled to a frame of a high profile vehicle; impact pads coupled to a front surface of the first and second vertical members; wherein each impact pad comprises an upper region and a lower region, wherein an outer surface of the lower region slopes outwardly and includes a plurality of grooves; and means for attaching the first and second vertical members to a frame of a vehicle.

In accordance with another embodiment of the present invention, a safety bumper system is disclosed. The system comprises, in combination: a high profile vehicle having a frame and at least one bumper; first and second vertical members adapted to be coupled to the frame of the high profile vehicle proximate the bumper; wherein the vertical members are adapted to be coupled so that a bottom portion thereof is approximately nine inches above a surface of a road; impact pads coupled to a front surface of the first and second vertical members, wherein each impact pad comprises an upper region and a lower region, wherein an outer surface of the lower region slopes outwardly and includes a plurality of grooves; and means for attaching the first and second vertical members to the frame of the high profile vehicle.

In accordance with a further embodiment of the present invention, a method for providing enhanced safety for a high profile vehicle is disclosed. The method comprises the steps of: providing a high profile vehicle having a frame and at least one bumper; coupling first and second vertical members to the frame of the high profile vehicle proximate the bumper; wherein the vertical members are coupled so that a bottom portion thereof is approximately nine inches above a surface of a road; and providing impact pads coupled to a front surface of the first and second vertical members, wherein each impact pad comprises an upper region and a lower region, wherein an outer surface of the lower region slopes outwardly and includes a plurality of grooves.

DETAILED DESCRIPTION OF THE PREFERRED EMBODIMENTS

Figure 1:
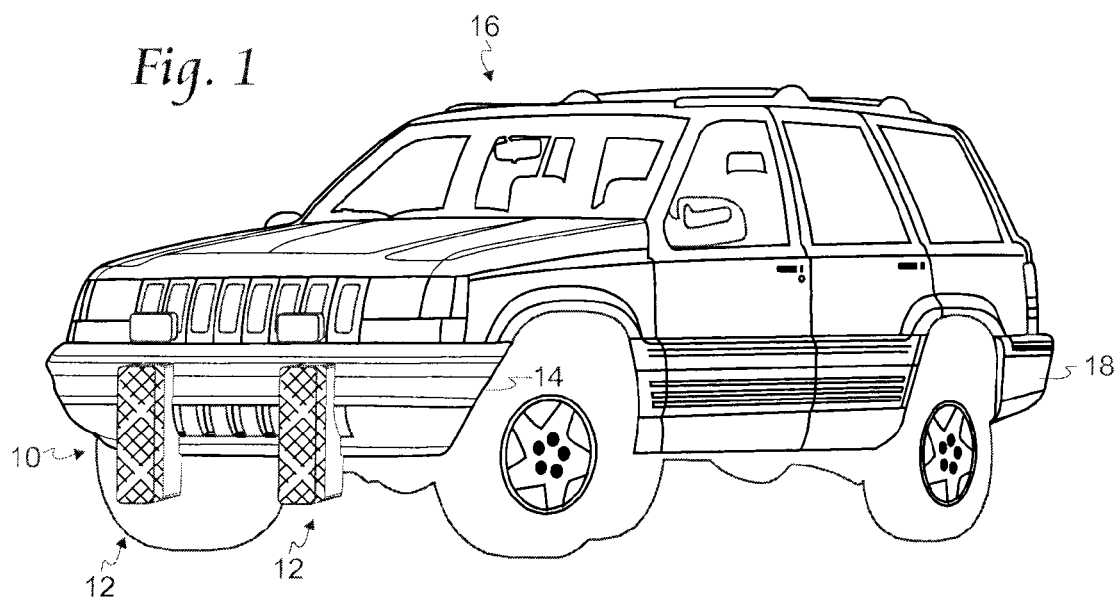
FIG. 1 is a perspective view of a sport utility vehicle, having a safety bumper system consistent with an embodiment of the present invention.
Figure 2:
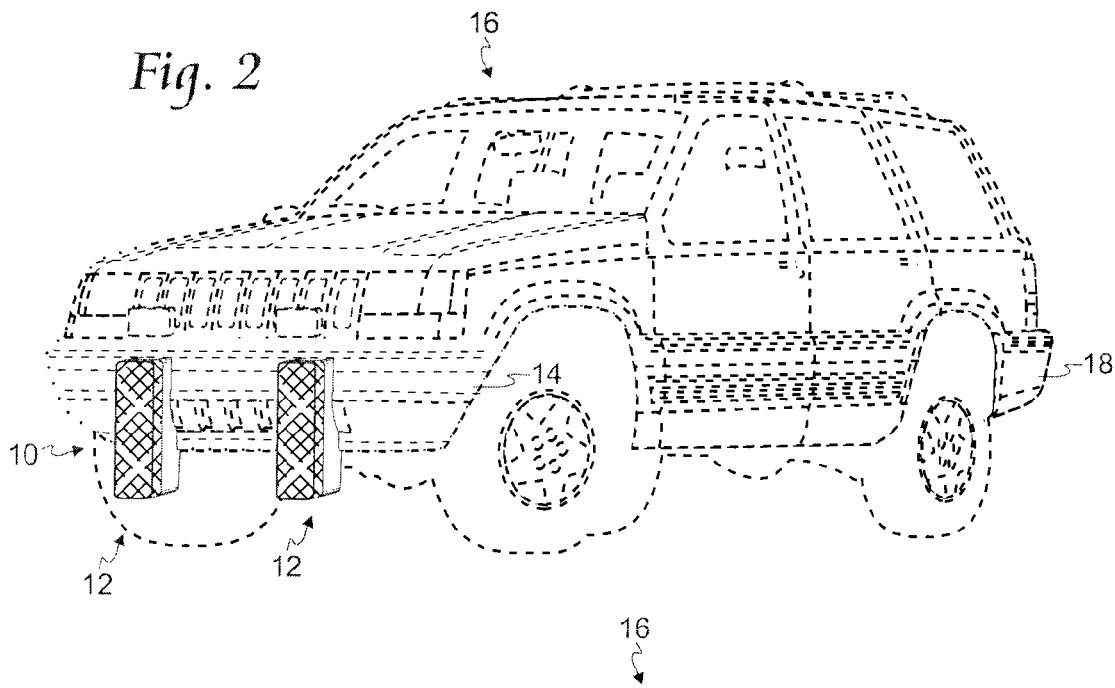
FIG. 2 is a perspective view of a safety bumper system consistent with an embodiment of the present invention, with a sport utility vehicle to which the system is attached shown in phantom.
Figure 3:
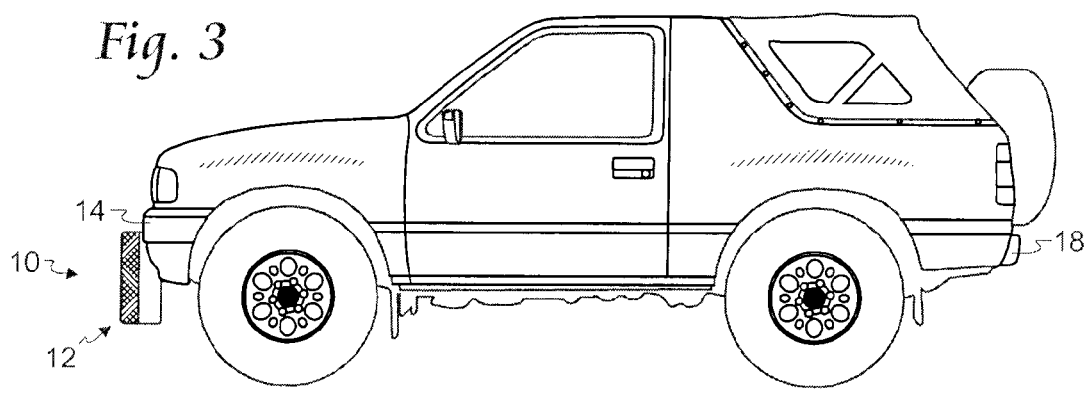
FIG. 3 is a side view of a pick-up truck, having a safety bumper system consistent with an embodiment of the present invention.

Referring first to FIGS. 1-3, an embodiment of a safety bumper system 10 (hereinafter "system 10") consistent with an embodiment of the present invention is shown. The system 10 generally comprises two vertical bumpers 12, which are positioned in a perpendicular relationship to a bumper 14 of a vehicle 16.

Figure 4:
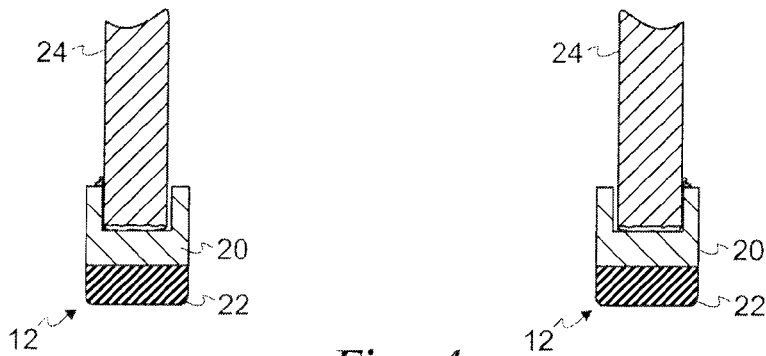
FIG. 4 is a top view of a safety bumper system, consistent with an embodiment of the present invention.
Figure 6:
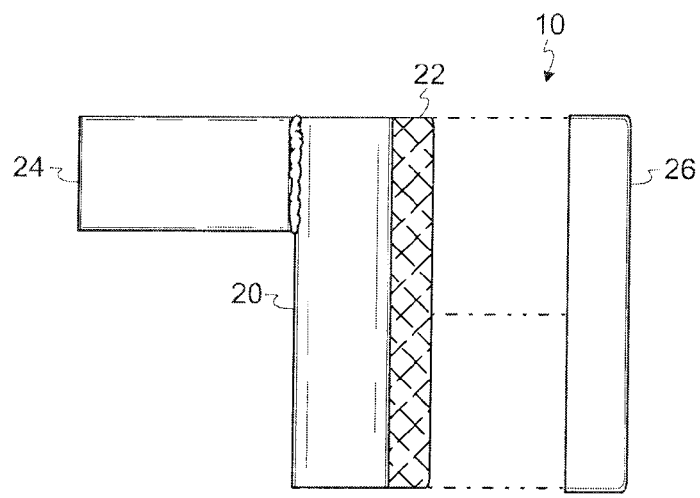
FIG. 6 is a side, partially exploded view of a safety bumper system, consistent with an embodiment of the present invention.

Referring specifically to FIGS. 4 and 6, in one embodiment, the bumpers 12 of the system 10 comprise vertical members 20 and impact pads 22 positioned in front of the vertical members 20. The vertical members 20 are preferably formed from a high strength material. In one embodiment, the vertical members 20 comprise channel iron, which has a U-shaped cross-section which more readily permits attachment to a vehicle frame 24. A preferred embodiment consists of a vertical member 20 comprised of channel iron having a width of about 2.5 to 3.0 inches, a thickness of 0.1875 inches, and a depth of about 1.5 inches. In a preferred embodiment, the impact pads 22 may have a thickness of about 2.0 to 2.5 inches for enhanced impact absorption. Preferably, the impact pads 22 are composed of molded rubber or some other suitable material.

Figure 5:
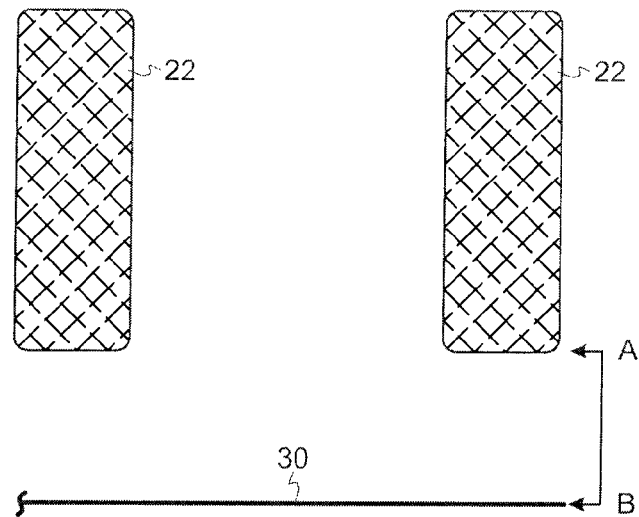
FIG. 5 is a front view of a safety bumper system, consistent with an embodiment of the present invention.

It is preferred to mount the vertical members 20 to the vehicle 16 by welding or otherwise coupling the vertical members 20 directly to the vehicle frame 24. Such coupling limits the possibility that one or both of the bumpers 12 could become separated from the vehicle 16 in the event of a collision. Referring now to FIG. 5, when in position, and in order to optimize effectiveness, it is preferred to couple the bumpers 12 to the frame 24 so that a bottom portion of the bumpers 12 is approximately nine inches above a surface of a road 30 on which the vehicle 16 is traveling—a distance defined by the line between points A and B. This positioning should permit the system 10 to extend sufficiently to contact a bumper surface for an overwhelming majority of conventional passenger vehicles that are currently on the market.

In one embodiment, as shown in FIG. 6, the bumpers 12 may each further include a bumper cover 26, which may be of a material commonly used as conventional bumper covers, to enable the system 10 to be visually conformed to the vehicle 16, including the bumper 14.

In one embodiment, the system 10 may be provided during manufacture of a vehicle 16, so that a vehicle 16 may be sold as a new car with the system 10 in place. In another embodiment, the system 10 may be provided as an after-market attachment, and may be coupled to a vehicle 16 that is already in use.

Turning now to FIGS. 7-12, another embodiment of a safety bumper system 40 (hereinafter "system 40") consistent with an embodiment of the present invention is shown. Similar to the system 10, the system 40 generally comprises two vertical bumpers 42, which are positioned in a perpendicular relationship to a bumper 14 of a vehicle 16.

Figure 10:
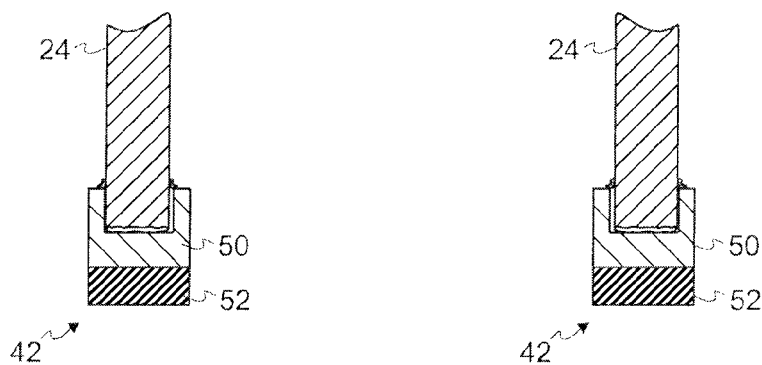
FIG. 10 is a top view of a safety bumper system, consistent with an embodiment of the present invention.
Figure 12:
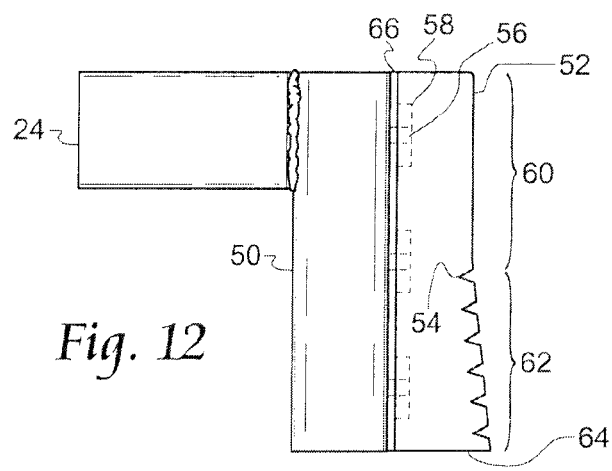
FIG. 12 is a side view of a safety bumper system, consistent with an embodiment of the present invention.

Referring specifically to FIGS. 10 and 12, in one embodiment, the bumpers 42 of the system 40 comprise vertical members 50 and impact pads 52 positioned in front of the vertical members 50. The vertical members 50 are preferably formed from a high strength material. In one embodiment, the vertical members 50 comprise channel iron, which has a U-shaped cross-section which more readily permits attachment to a vehicle frame 24. A preferred embodiment consists of a vertical member 50 comprised of channel iron having a width of about 2.5 to 3.0 inches, a thickness of 0.1875 inches, and a depth of about 1.5 inches.

Figure 7:
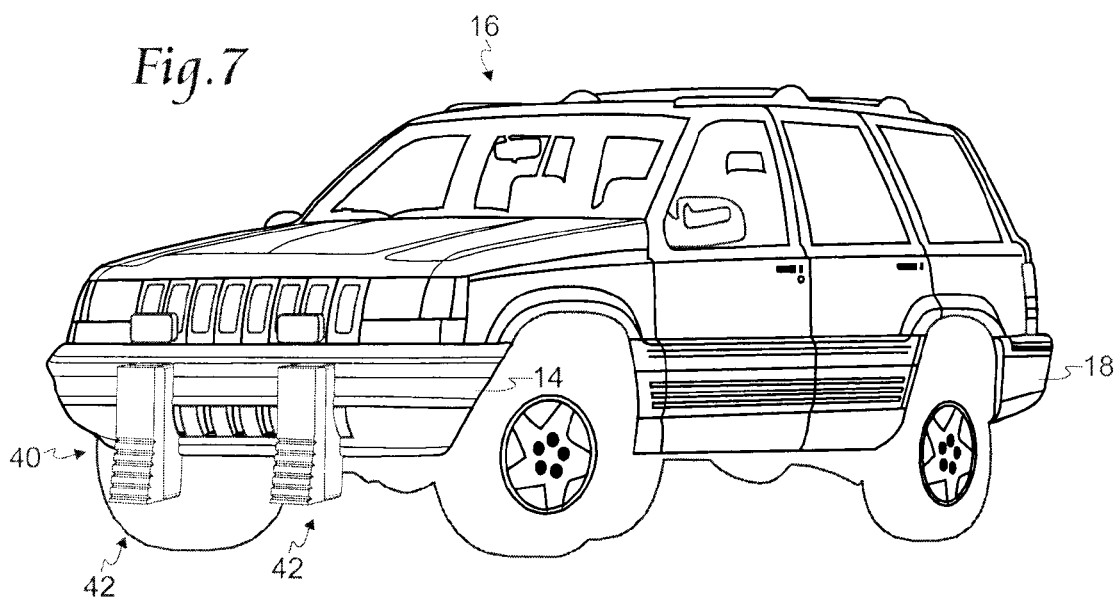
FIG. 7 is a perspective view of a sport utility vehicle, having a safety bumper system consistent with an embodiment of the present invention.
Figure 8:
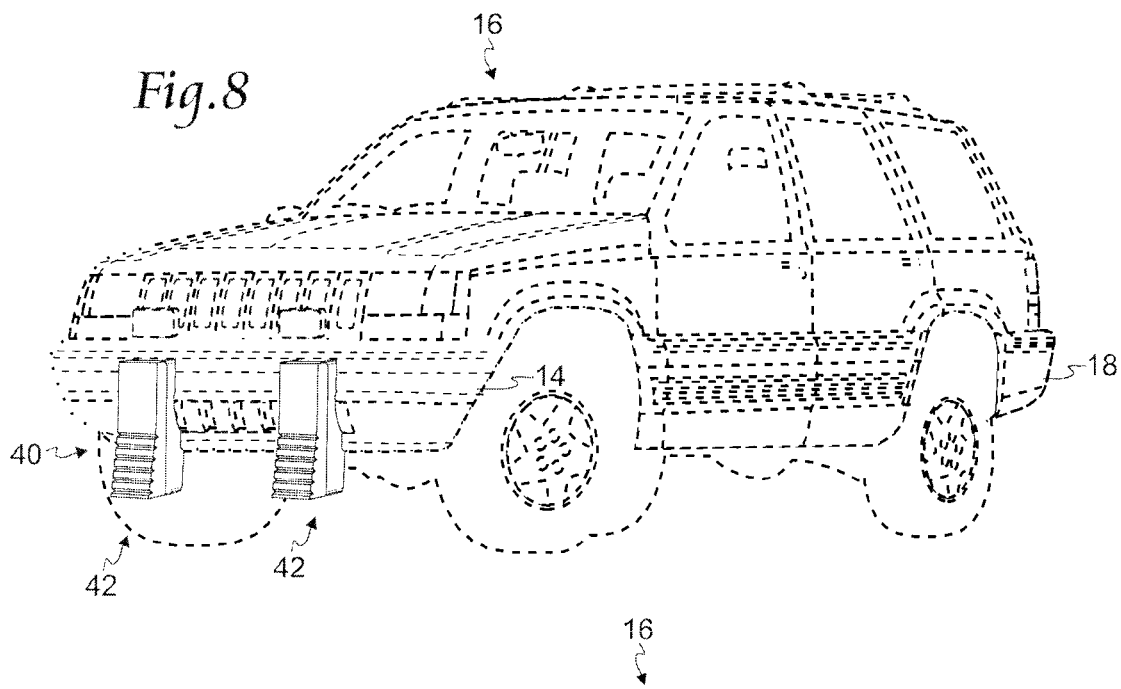
FIG. 8 is a perspective view of a safety bumper system consistent with an embodiment of the present invention, with a sport utility vehicle to which the system is attached shown in phantom.
Figure 9:
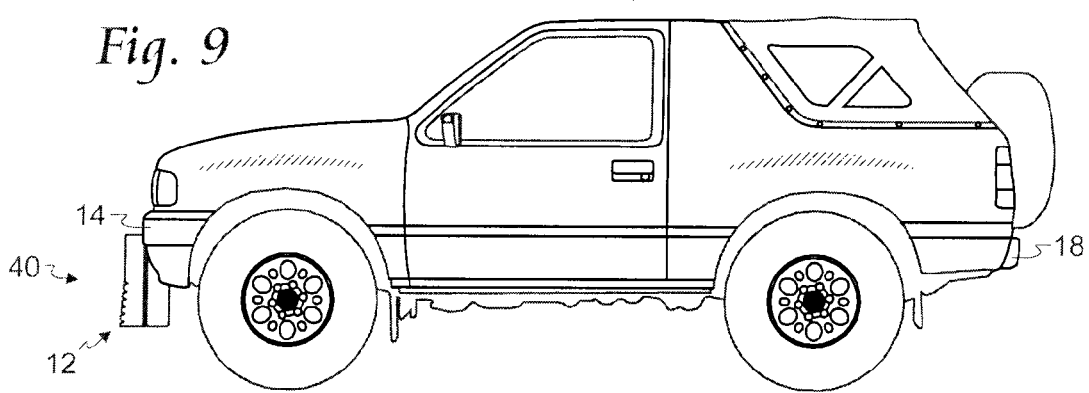
FIG. 9 is a side view of a pick-up truck, having a safety bumper system consistent with an embodiment of the present invention.

Preferably, the impact pads 52 are composed of molded rubber or some other suitable material. Each impact pad 52 preferably has an overall width of approximately 4.0 inches and an overall length of approximately 12.0 inches. In a preferred embodiment, the impact pads 52 include an upper region 60 and a lower region 62. The upper region 60 preferably has a thickness of about 2.0 to 2.5 inches for enhanced impact absorption, and preferably extends for a length of approximately 6.0 inches. Preferably, the lower region 62 has a length of approximately 6.0 inches. The lower region 62 preferably slopes outwardly, such that it angles away from the vehicle 16 when in position thereon, as seen in FIGS. 7-9. In this regard, in a preferred embodiment, a portion of the lower region 62 that is adjacent to the upper region 60 may have a thickness of about 2.0 to 2.5 inches, while a bottom portion 64 (as seen in FIG. 12) of the lower region 62 may have a thickness of about 3.0 inches, preferably 3.131 inches. In the event of a collision, the outward sloping of the lower region 62 may assist in preventing an impacting vehicle from sliding upwardly or downwardly along the vertical bumpers 42 upon impact with a vehicle outfitted with the system 40.

The lower region 62 further includes a plurality of grooves 54. In a preferred embodiment, the lower region 62 includes six grooves 54. However, the lower region 62 may include more or less than six grooves 54. Preferably, the uppermost groove 54 on each impact pad 52 is positioned approximately 6.249 inches from the top of each impact pad 52. Preferably, each groove 54 is substantially V-shaped, wherein each "V" forms an angle of approximately 45 degrees. In a preferred embodiment, each groove 54 has a depth of approximately 0.5 inches. Preferably, the distance between consecutive grooves 54 is approximately 1.0 inch. In the event of a collision, the grooves 54 would help an impacting vehicle to become jammed therein, thereby assisting in preventing an impacting vehicle from sliding upwardly or downwardly along the vertical bumpers 42 upon impact with a vehicle outfitted with the system 40.

For purposes of attaching the impact pads 52 to the vertical members 50, each vertical bumper 42 preferably further includes a plate 66 coupled to an inner surface of the impact pad 52, as seen in FIG. 12. The plate 66, in turn, may be coupled to the vertical member 50. Preferably, the plate 66 is composed of cold rolled steel or some other suitable material. In a preferred embodiment, each plate 66 has a length of approximately 12.0 inches, a width of approximately 4.0 inches, and a thickness of approximately 0.5 inches. Each plate 66 includes a plurality of openings 56, through which fasteners may be inserted in order to couple the plate 66 to the impact pad 52. In the embodiment shown in FIGS. 11 and 12, three openings 56 are included in each plate 66, but more or less openings 56 may be employed.

In order to couple each plate 66 to each impact pad 52, washers 58 may be positioned over each opening 56 and fasteners may be inserted through each opening 56 and into the impact pad 52. Each plate 66 may be secured to each vertical member 50 by welding or otherwise coupling each plate 66 to each vertical member 50. Preferably, each washer 58 has a diameter of approximately 2.0 inches.

Figure 11:
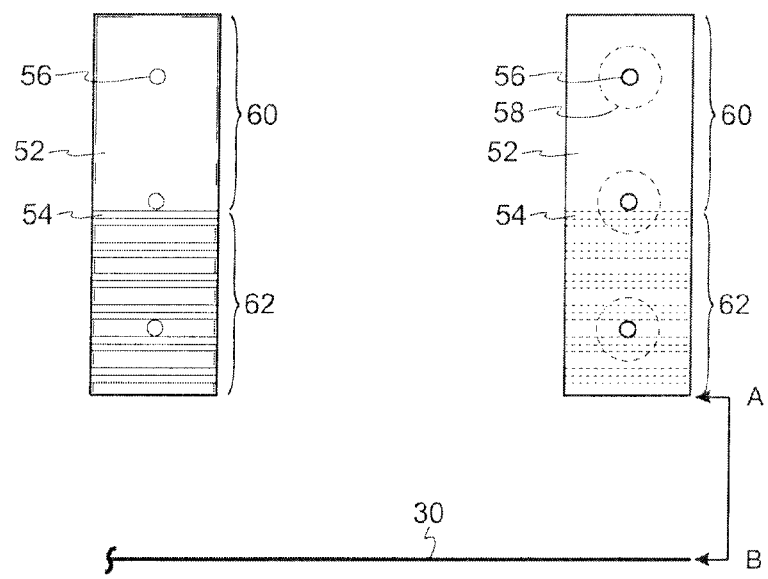
FIG. 11 is a front view of a safety bumper system, consistent with an embodiment of the present invention, in which an impact pad is shown on a first half of the safety bumper system with a plate portion attached thereto shown in phantom, and a plate portion is shown on a second half of the safety bumper system with an impact pad attached thereto shown in phantom.

It is preferred to mount the vertical members 50 to the vehicle 16 by welding or otherwise coupling the vertical members 50 directly to the vehicle frame 24. Such coupling limits the possibility that one or both of the bumpers 42 could become separated from the vehicle 16 in the event of a collision. Referring now to FIG. 11, when in position, and in order to optimize effectiveness, it is preferred to couple the bumpers 42 to the frame 24 so that a bottom portion of the bumpers 42 is approximately nine inches above a surface of a road 30 on which the vehicle 16 is traveling—a distance defined by the line between points A and B. This positioning should permit the system 40 to extend sufficiently to contact a bumper surface for an overwhelming majority of conventional passenger vehicles that are currently on the market.

In one embodiment, the bumpers 42 may each further include a bumper cover (not shown), which may be of a material commonly used as conventional bumper covers, to enable the system 40 to be visually conformed to the vehicle 16, including the bumper 14.

In one embodiment, the system 40 may be provided during manufacture of a vehicle 16, so that a vehicle 16 may be sold as a new car with the system 40 in place. In another embodiment, the system 40 may be provided as an after-market attachment, and may be coupled to a vehicle 16 that is already in use.

Although particular embodiments of the invention have been described in detail for purposes of illustration, various modifications may be made without departing from the spirit and scope of the invention. Accordingly, the invention is not to be limited, except as by the appended claims.

For example, variation of the measurements disclosed herein would be possible without departing from the spirit or scope of the present invention. In addition, while the system 10 is shown in FIGS. 1-3 as being coupled to the front portion of the vehicle 16, it should be noted that the system 10 could be coupled—additionally or in the alternative—to a rear bumper 18 of the vehicle 16. Similarly, while the system 40 is shown in FIGS. 7-9 as being coupled to the front portion of a vehicle 16, it should be noted that the system 40 could be coupled—additionally or in the alternative—to the rear bumper 18 of the vehicle 16.

I claim:

1. A safety bumper system comprising, in combination:
   a high profile vehicle having a frame and at least one bumper;
   first and second vertical members each having a top portion and a bottom portion, the top portion of each of the first and second vertical members adapted to be directly coupled to the frame of the high profile vehicle proximate the bumper so that the bottom portion of the first and second vertical members extends substantially below the frame and bumper of the high profile vehicle to direct a force of a collision to the frame of the high profile vehicle to prevent the high profile vehicle from going on top of a lower profile vehicle;
   wherein the vertical members are adapted to be coupled so that a bottom portion thereof is approximately nine inches above a surface of a road;
   impact pads coupled to a front surface of the first and second vertical members, wherein each impact pad comprises an upper region and a lower region, wherein an outer surface of the lower region slopes outwardly and includes a plurality of substantially horizontal grooves and wherein an outer surface of the upper region being substantially flat; and
   means for attaching the first and second vertical members to the frame of the high profile vehicle.

2. The system of claim 1 wherein the first and second vertical members are comprised of channel iron.

3. The system of claim 2 wherein the channel iron has a width of about two and one-half to three inches, a thickness of three-sixteenths of an inch, and a depth of about one and one-half inches.

4. The system of claim 1 wherein the upper region of the impact pads has a thickness of about two to two and one-half inches and a bottom portion of the lower region has a thickness of about three inches.

5. The system of claim 1 further comprising plates positioned over an unexposed surface of the impact pads.

6. The system of claim 5 wherein the plates include a plurality of openings adapted to receive fasteners for coupling the plates to the impact pads.

7. A method for providing enhanced safety for a high profile vehicle comprising the steps of:
   providing a high profile vehicle having a frame and at least one bumper;
   coupling a top portion of first and second vertical members to the frame of the high profile vehicle proximate the bumper so that the first and second vertical members extend substantially below the frame and the bumper of the vehicle with a bottom portion of the first and second vertical members approximately nine inches above a surface of a road; and
   providing impact pads coupled to a front surface of the first and second vertical members, wherein each impact pad comprises an upper region and a lower region, wherein an outer surface of the lower region slopes outwardly and includes a plurality of substantially horizontal grooves and an outer surface of the upper region begin substantially flat.

8. The method of claim 7 wherein the first and second vertical members are comprised of channel iron.

9. The method of claim 8 wherein the channel iron has a width of about two and one-half to three inches, a thickness of three-sixteenths of an inch, and a depth of about one and one-half inches.

10. The method of claim 7 wherein the upper region of the impact pads has a thickness of about two to two and one-half inches and a bottom portion of the lower region has a thickness of about three inches.

11. The method of claim 7 further comprising plates positioned over an unexposed surface of the impact pads.

12. The method of claim 11 wherein the plates include a plurality of openings adapted to receive fasteners for coupling the plates to the impact pads.

13. The method of claim 7 wherein the bumper is the front bumper of the high profile vehicle.

* * * * *